(No Model.) 5 Sheets—Sheet 1.
T. TRIPP.
METALLIC PACKING.
No. 391,991. Patented Oct. 30, 1888.
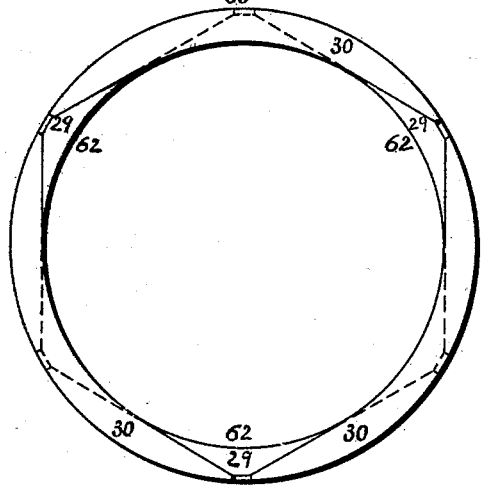
Fig. 4.
Fig. 3.
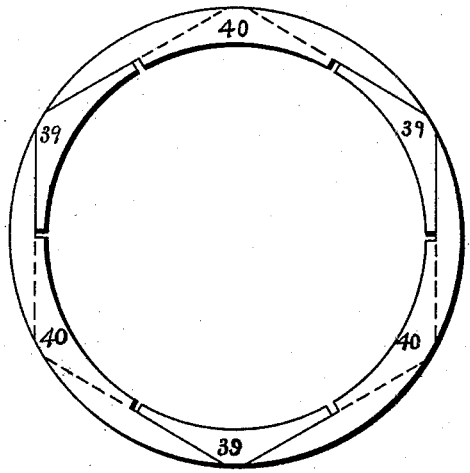
Fig. 8.
Fig. 7.
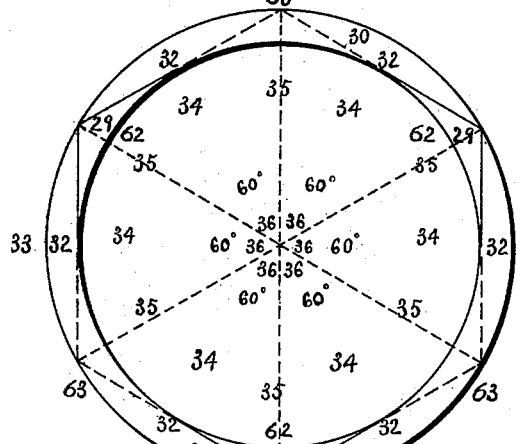
Fig. 2.
Fig. 1.
WITNESSES.
O. L. Perry.
James A. Woodbury.
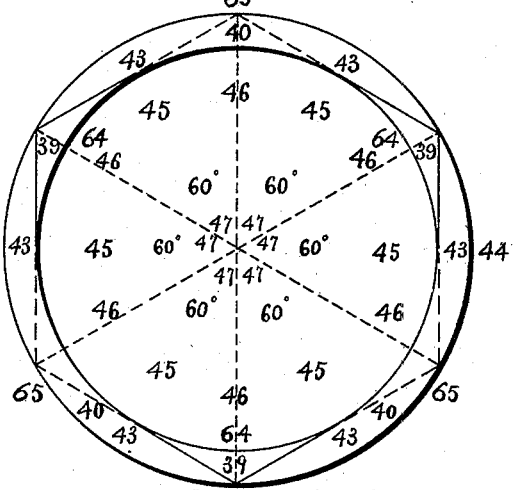
Fig. 6.
Fig. 5.
INVENTOR,
Thomas Tripp.
BY
E. Frank Woodbury.
ATTORNEY.

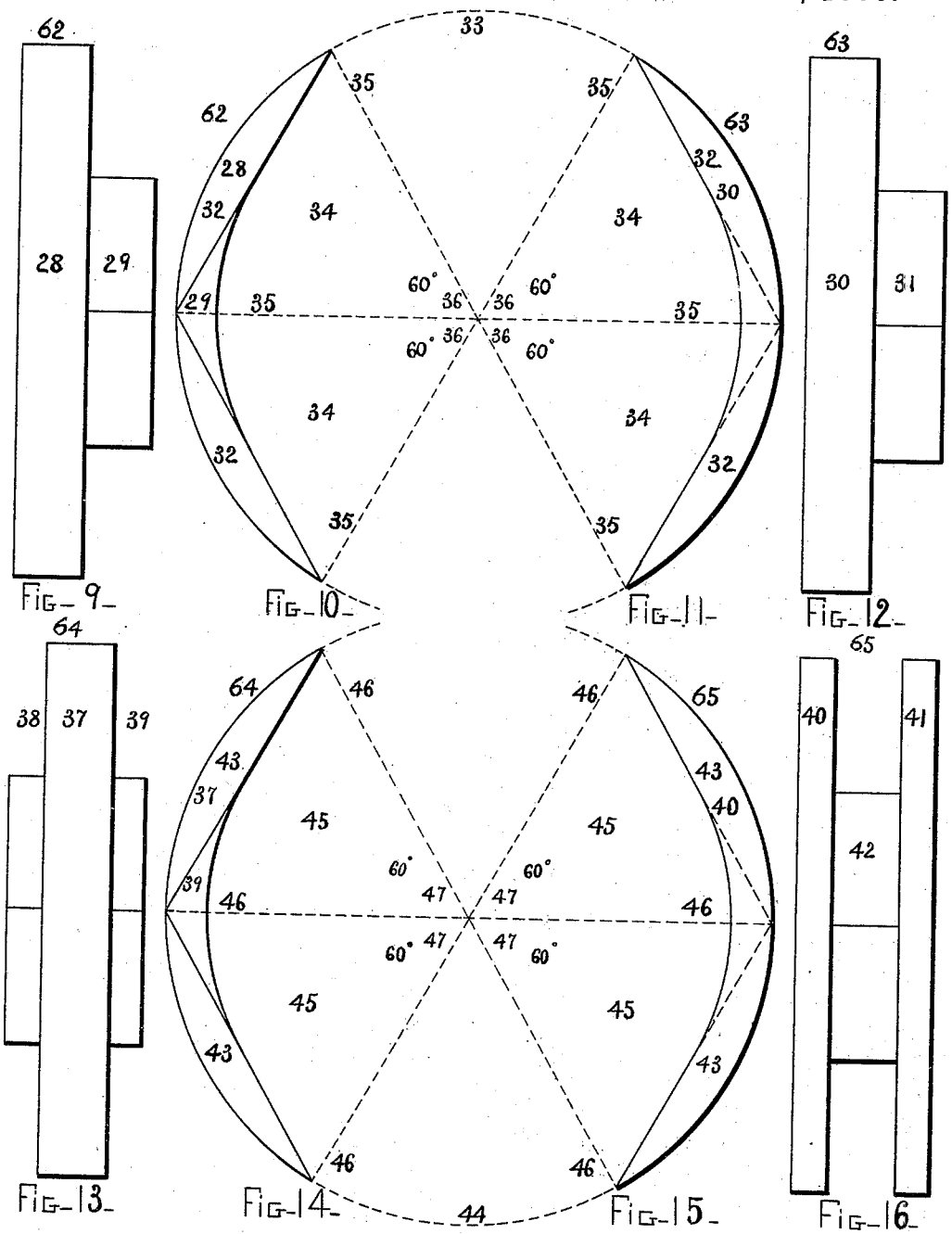

(No Model.) 5 Sheets—Sheet 3.
T. TRIPP.
METALLIC PACKING.
No. 391,991. Patented Oct. 30, 1888.
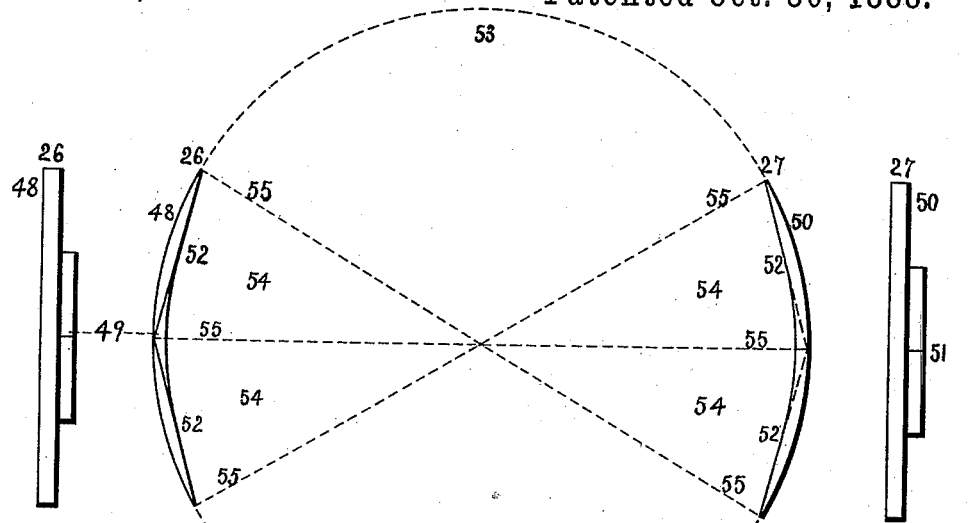
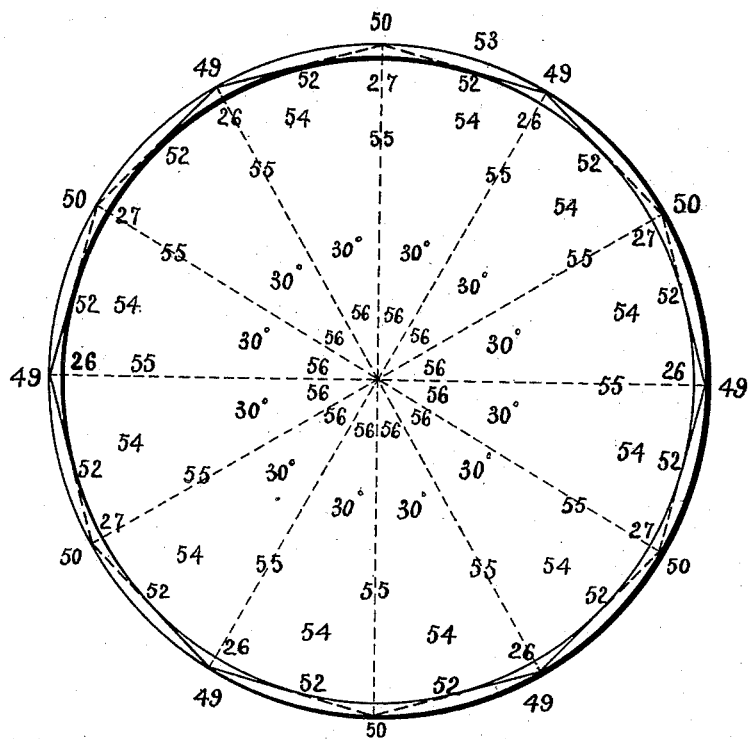
WITNESSES:
W. L. Berry.
James A. Woodbury.
INVENTOR,
Thomas Tripp.
BY
E. Frank Woodbury.
ATTORNEY.

(No Model.) 5 Sheets—Sheet 4.

T. TRIPP.
METALLIC PACKING.

No. 391,991. Patented Oct. 30, 1888.

WITNESSES.
Walter L. Perry.
James A. Woodbury.

INVENTOR,
Thomas Tripp
BY
E. Frank Woodbury.
ATTORNEY, (No Model.) 5 Sheets—Sheet 5.

T. TRIPP.
METALLIC PACKING.

No. 391,991. Patented Oct. 30, 1888.

WITNESSES:
Walter L. Perry.
James A. Woodbury.

INVENTOR.
Thomas Tripp,
BY
E. Frank Woodbury.
ATTORNEY.

N. PETERS, Photo-Lithographer, Washington, D. C.

UNITED STATES PATENT OFFICE.

THOMAS TRIPP, OF EAST STOUGHTON, MASSACHUSETTS.

METALLIC PACKING.

SPECIFICATION forming part of Letters Patent No. 391,991, dated October 30, 1888.

Application filed January 5, 1888. Serial No. 259,921. (No model.)

*To all whom it may concern:*

Be it known that I, THOMAS TRIPP, of East Stoughton, in the county of Norfolk and State of Massachusetts, have invented certain new and useful Improvements in Metallic Packing, of which the following, taken in connection with the accompanying drawings, is a specification.

My invention relates to metallic packing for pistons, piston-valves, piston-rods, and the like of engines, pumps, and the like. It is also designed as an improvement of my inventions patented by me in the United States, as per Letters Patent No. 265,470, dated October 3, 1882, and No. 352,166, dated November 9, 1886.

My invention has for its object the production of packings that will be more efficient than other packings now in use, and that will be especially adapted for use in piston-valves, in pistons of cylinders of large diameters, and about plungers of large size. My packings are also especially adapted for use under high pressures of steam or other gases and fluids.

Figure 22:
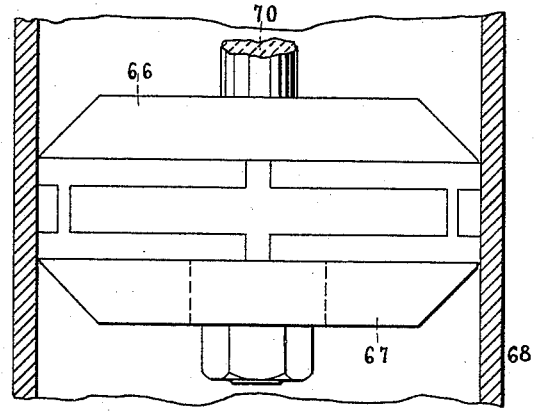
Figure 23:
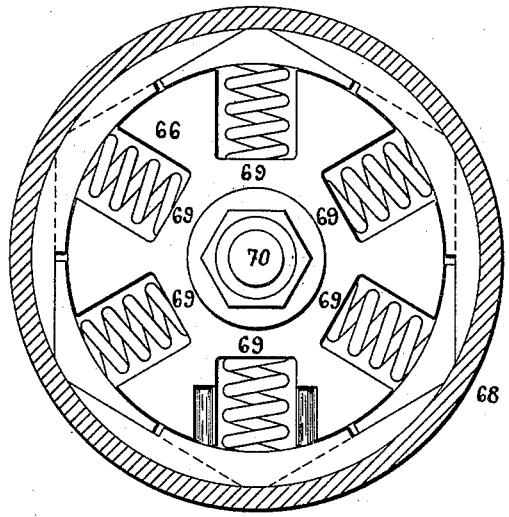
Figure 25:
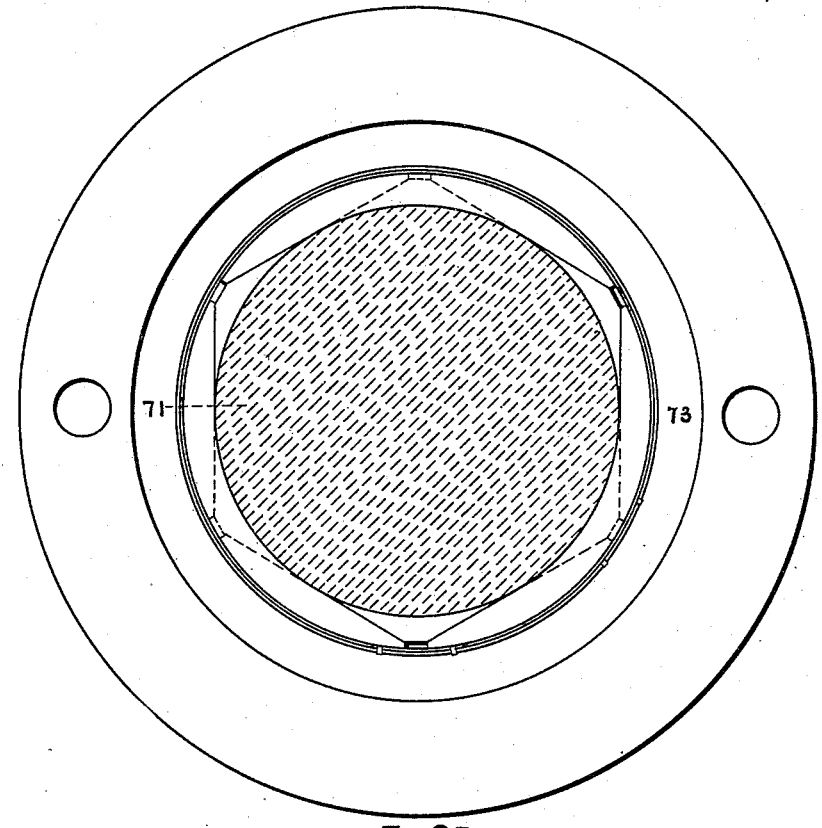
Figure 24:
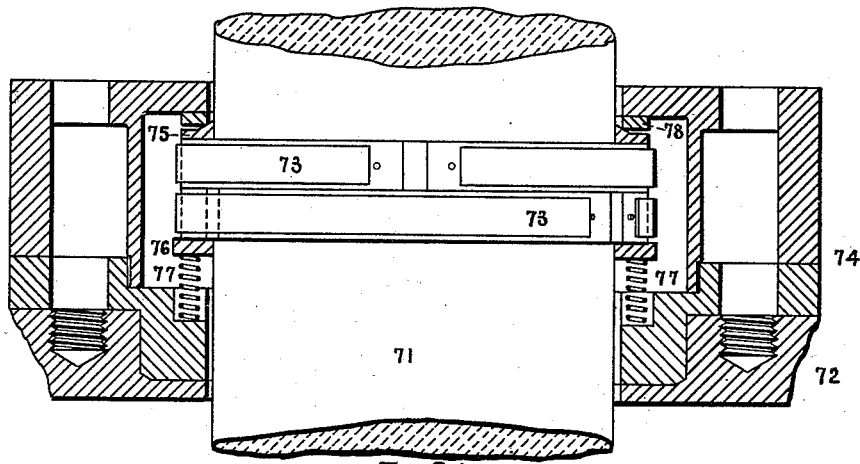

Figure 1 represents packing, in front elevation, composed of six separate pieces of the single-lip type; and Fig. 2 is a side elevation of same. Fig. 3 represents in front elevation packing composed of six separate pieces of the single-lip type, same as shown by Figs. 1 and 2, with the exception of the changes necessary to adapt same for use upon piston-rods and the like; and Fig. 4 is a side elevation of same. Fig. 5 represents packing in front elevation, composed of six separate pieces of the double-lip and flange type; and Fig. 6 is a side elevation of same. Fig. 7 represents in front elevation packing composed of six separate pieces of the double lip and flange type, same as shown by Figs. 5 and 6, with the exception of the changes necessary to adapt same for use in pistons, piston-valves, and the like; and Fig. 8 is a side elevation of same. Figs. 9 and 10 are respectively enlarged side and front views of the single lip pieces of packing 62, composing in number one-half the packing represented by Figs. 1 and 2. Figs. 11 and 12 are respectively enlarged front and side views of the single-lip pieces of packing 63, composing one-half the packing represented by Figs. 1 and 2. Figs. 13 and 14 are respectively enlarged side and front views of the double-lip and flange-type pieces of packing 64 of the packing represented by Figs. 5 and 6. Figs. 15 and 16 are respectively enlarged front and side views of the double-lip and flange-type pieces of packing 65 of the packing represented by Figs. 5 and 6. Fig. 17 represents packing drawn to a small scale in front elevation, composed of twelve separate pieces of the single-lip type. Figs. 18 and 19 are respectively side and front views of the single-lip pieces of packing 26 of the packing represented by Fig. 17. Figs. 20 and 21 are respectively front and side views of the single-lip pieces of packing 27 of the packing represented by Fig. 17. Fig. 22 represents in side elevation the packing, Fig. 8, as applied to pistons for cylinders and the like, showing the cylinder in central section. Fig. 23 is an inverted plan of Fig. 22, with the piston follower-plate removed, and a cross-sectional view of the cylinder. Fig. 24 represents in side elevation the packing, Fig. 4, as applied to a piston-rod, all other parts necessary to illustrate mode of application of the packing being shown in central section. Fig. 25 is a plan of Fig. 24, with gland, sliding ring, and cone-joint ring removed.

The packing may be made of any well-known suitable material. Packing for use in cylinders, steam-chests, and the like of cast-iron I prefer should be made of cast-iron. Packing for use about rods and the like of wrought-iron or steel I prefer should be made of babbitt and composition, that portion of the packing which comes in wearing contact with the rod being made of babbitt and the remainder of the packing being made of composition. The packings are intended to be used in the usual and well-known manner. The packing for use in cylinders and pistons and the like is held in the usual manner between the plates of the piston or piston-valve, and the packing is held against the bore of the cylinder by pressure exerted—preferably by springs—in the common and usual well-known manner. Packing for use about piston-rods and the like is held in position about the rod by pressure exerted—preferably by springs—in the usual well-known manner, the packing being commonly inclosed and held in place by a gland.

In placing upon the market packings described by my said Letters Patent No. 265,470 and No. 352,166 I discovered a want that could not be perfectly or satisfactorily met using packing made in accordance with said Letters Patent for the following reasons, the packing being made of four pieces.

First. For cylinders of large diameter the packing must necessarily be made of too thick a ring and the packing in use had a tendency to wear the cylinder out of its circular shape in the shape of a four-leaf clover.

Second. For use about plungers of large diameter the packing would have to be made of too thick a ring and a ring too clumsy in its size.

Third. For use in piston-valves the packing had a tendency when running off the ports to tip and catch on the ports. It also had, when running off the ports, a tendency to collapse under the steam-pressure.

Fourth. For the reasons above stated, and other minor reasons, it was evident to me that while my packing as made in four pieces was a superior packing, yet if I could make it in more than four pieces it would be a great and valuable improvement. Therefore I have spent a great deal of time and money in experimenting to obtain the result desired without success until I discovered a geometric principle of construction, which enables me to attain my much-sought-after result. The said geometric principle may be expressed as follows: A metallic packing composed of an even number of separate pieces, the joint-line of which will represent a chord of a circle, the number of chords of equal length of which will be equal to the number of pieces of separate packing. Each joint-line of each joint of each separate piece of packing forms the base of an isosceles triangle, the equal sides of which are formed by radial lines from the center of said circle and the angle in degrees, formed at the apex of said triangle by said equal sides must be a number which if multiplied by the number of pieces composing the packing will equal three hundred and sixty degrees. By the use of this geometrical formula packings may be made as desired having any desired even number of pieces.

The packing of the single-lip type, as illustrated by Figs. 1, 2, 9, 10, 11, and 12, is made as follows: It is composed of an even number of pieces—six, three of 62 and three of 63. In the single-lip type the pieces are alike. Therefore 62 and 63 are alike. The piece 62, Figs. 9 and 10, is constructed as follows: It is provided with the flange 28 and the projecting side lip 29. The piece 63, Figs. 11 and 12, is in a like manner constructed as follows: It is provided with the flange 30 and the projecting side lip 31. The sides are made to dimensions so that when assembled they will form the packing, as represented by Figs. 1 and 2, which is constructed as follows, in accordance with said geometric formula: First, it is composed of an even number of pieces—six, three of 62 and three of 63; second, the joint-line 32 represents a chord of the circle 33; third, the number of joint-lines 32 or chords, which are of equal lengths, are six in number and they are equal in number to the number of pieces of separate packing; fourth, each joint-line 32 of each joint of each separate piece of packing forms the base of the isosceles triangle 34, the equal sides of which are formed by the radial dotted lines 35 from the center of the circle 33; fifth, the angle 36 in degrees 60, formed at the apex of triangle 34, multiplied by the number of pieces—six—composing the packing equals three hundred and sixty degrees.

The packing as constructed, and as represented by Figs. 1, 2, 9, 10, 11, and 12, to be used about piston-rods, plungers, and the like should have the points or edges of the flange portion of the separate portion of the separate pieces of packing cut away, as shown by Figs. 3 and 4, for the obvious reason to permit the packings to advance toward the center of the rod or plunger which it embraces to compensate for wear.

The packing as represented by Figs. 5, 6, 13, 14, 15, and 16, is of the double-lip and flange type, and is made as follows: It is composed of an even number of pieces—six pieces, three of 64 and three of 65. Each piece 64 is made as shown by Figs. 13 and 14, and is constructed with the flange 37 and the projecting lips 38 and 39. Each piece 65 is made as shown by Figs. 15 and 16, and is constructed with the flanges 40 and 41, united by the center piece, 42. The pieces are made to dimensions, so that when assembled they will form the packing as represented by Figs. 5 and 6, which is constructed as follows, in accordance with said geometrical formula: First, it is composed of an even number of pieces—six, three of 64 and three of 65; second, the joint-line 43 represents a chord of the circle 44; third, the number of joint-lines 43 or chords, which are of equal length, are six in number, and they are equal in number to the number of pieces of separate packing; fourth, each joint-line 43 of each joint of each separate piece of packing forms the base of the isosceles triangle 45, the equal sides of which are formed by the radial dotted lines 46 from the center of the circle 44; fifth, the angle 47 in degrees 60, formed at the apex of the triangle 45, multiplied by the number of pieces—six—composing the packing, equals three hundred and sixty degrees.

The packing as represented by Figs. 5, 6, 13, 14, 15, and 16, to be used in pistons for cylinders and the like should have the points or edges of the lips and center pieces of the separate pieces of packing cut away, as shown by Figs. 7 and 8, to allow the requisite contracting of the packing in use without the said edges coming in contact. The outside diameter of the packing is diminished so that the contact-surface against the inside of the cylinder, of the lips, and center piece will be a surface of some width instead of a line, which would be liable to injure the interior of the cylinder. The inside diameter of the packing is also sometimes diminished, as shown by Figs. 7 and 8, in order to strengthen the packing, which has been reduced in strength by the reducing of its outside diameter for the same, as stated.

The packing of the single-lip type, as illustrated by Figs. 17 to 21, inclusive, is made as follows: It is composed of an even number of pieces—twelve, six of 26 and six of 27. This packing being of the single-lip type, the pieces 26 and 27 are alike. The piece 26, Figs. 18 and 19, is made as follows: It is provided with the flange 48 and the projecting side lip 49. The piece 27, Figs. 20 and 21, is in like manner constructed as follows: It is provided with the flange 50 and the projecting lip 51. The pieces are made to dimensions, so that when assembled they will form the packing as represented by Fig. 17, which is constructed in accordance with my said geometrical formula, as follows: First, it is composed of an even number of pieces—twelve, six of 26 and six of 27; second, the joint-line 52 represents a chord of the circle 53; third, the number of joint-lines, 52, or chords, which are of equal length, are twelve in number, and they are equal in number to the number of pieces of separate packing; fourth, each joint-line 52 of each joint of each separate piece of packing forms the base of the isosceles triangle 54, the equal sides of which are formed by the radial dotted lines 55 from the center of the circle 53; fifth, the angle 56 in degrees 30, formed at the apex of the triangle 54, multiplied by the number of pieces—twelve—composing the packing, equals three hundred and sixty degrees.

In Figs. 22 and 23 the packing, Figs. 7 and 8, is fitted between the piston-head or spider 66 and the follower-plate 67 in the usual manner within the cylinder 68. The follower-plate 67 is securely bolted to the piston-head in the usual manner by means of bolts. (Not shown.) The packing is held in contact with the cylinder by means of spring-pressure obtained by the use of the spiral springs 69. The piston-head is provided with the piston-rod 70.

In Figs. 24 and 25 the packing, Figs. 3 and 4, is fitted around the piston-rod 71, which is represented in connection with a portion of the front cylinder-head, 72, of an ordinary steam-engine. The packing is held in contact with the rod by means of spring-pressure obtained by the use of the plate-springs 73. The packing is placed about the piston-rod within the double case 74, as shown, and is held in its position against the cone-joint ring 75, near the head of the case, by means of packing follower-ring 76 and spiral springs 77, two of which are shown in Fig. 24. Between the packing and the head of the case are placed the cone-joint ring 75 and the sliding ring 78. The function of these rings 76, 75, and 78 and spiral springs 77 is as follows: In any sidewise movement of the rod the packing is free to go with the rod, for the reason that ring 78 may slide on the inner surface of the head of the case, while the follower-ring 76 is free to move or slide, for the reason that it is supported by the spiral springs, and if the rod does not run in line the packing is free to go with the rod, for the reason that the cone joint-ring 75 may tip in the sliding ring 78. The follower-ring 76, being supported by spiral springs, permits such tipping. The double case is securely bolted to the cylinder-head by bolts (not shown) in the usual manner.

This packing or any other consisting of an even number of pieces, if constructed in accordance with geometrical formula, may be adapted for use in pistons, piston-valves, and the like, or for piston-rods, plungers, and the like of the single-lip or double-lip and flange type at pleasure in a manner similar to packings, as represented by Figs. 7 and 8 or 3 and 4, respectively.

The tendency of the times being the use for power purposes of high pressures, it is very necessary that packings for use in pistons and piston-valves should not be likely to collapse. It will be seen that as the number of pieces composing a packing is increased its liability to collapse is decreased, as the greater the number of packing-pieces, and consequently joint-lines or chords, the more circular in shape would be the outline of the figure made by said chords and the nearer parallel would one chord be to its mate or adjoining chord, thereby diminishing its liability to collapse.

It is also very desirable, especially for use in piston-valves, to make the packing of the double-lip and flange type, for the reason that the packing-pieces are more thoroughly interlocked, thereby increasing its efficiency.

It will be noticed that all packing-pieces composing all packings made as described and shown, whether of the single-lip or double-lip and flange type, are radially interlocked—that is to say, the packing-pieces, by reason of their interlocking construction, move as a unit radially.

My ideal packing for piston-valves is a packing that in its use permits a freedom and safety of motion of a so-called "plug-piston valve," yet possessing the qualities of a packed piston-valve—that is, a piston-valve that will wear tight and that will not stick, that will not collapse, and that will not break. Such a packing is represented by 7 and 8.

What I claim as new, and desire to secure by Letters Patent, is—

1. A metallic packing composed of an even number of separate packing-pieces more than four, the joint-line of each of which will be a chord, as 32, of a circle, as 33, the number of chords, as 32, of equal length will be equal to the number of pieces of separate packing, each joint-line of each joint, as 32, of each separate piece of packing forming the base of an isosceles triangle, as 34, substantially as and for the purposes set forth.

2. A metallic packing composed of an even number of packing-pieces more than four, provided with projecting side lips and flanges, by means of which the packing-pieces are compelled in use to move radially in unison, substantially as described.

3. A metallic packing composed of an even number of packing-pieces, one-half of said pieces being provided each with a flange, as 37, and lips, as 38 and 39, and the remainder of said pieces each being provided with a center piece, as 42, and flanges as 40 and 41, substantially as and for the purposes set forth.

In testimony whereof I have signed my name to this specification, in the presence of two subscribing witnesses, on this 2d day of January, A. D. 1888.

THOMAS TRIPP.

Witnesses:
E. FRANK. WOODBURY,
J. L. BAILEY.